April 18, 1961 G. H. ALLEN 2,979,942
ACCELERATION TESTER
Filed March 18, 1958 3 Sheets-Sheet 1

INVENTOR.
GERALD H. ALLEN
BY
Woodhams Blanchard and Flynn
ATTORNEYS

April 18, 1961 G. H. ALLEN 2,979,942
ACCELERATION TESTER
Filed March 18, 1958 3 Sheets-Sheet 2

INVENTOR.
GERALD H. ALLEN
BY
Woodhams Blanchard and Flynn
ATTORNEYS

United States Patent Office 2,979,942
Patented Apr. 18, 1961

2,979,942

ACCELERATION TESTER

Gerald H. Allen, Kalamazoo Township, Kalamazoo County, Mich., assignor to Allen Electric & Equipment Company, Kalamazoo, Mich., a corporation of Michigan Filed Mar. 18, 1958, Ser. No. 722,337

7 Claims. (Cl. 73—117)

This invention relates in general to automobile servicing equipment and, more particularly, to an apparatus intended primarily for garage and service station use in measuring the acceleration obtainable in and by a given automobile vehicle.

It has long been well understood by garage and service station personnel that a considerable variety of information relating to the condition of an automobile can be obtained by checking its ability to accelerate. However, it has in the past been necessary to "road test" the automobile, that is, to actually drive it on a suitable highway, in order to determine its ability to accelerate. In view of the abnormal accelerations and speeds attained at least momentarily, in such an acceleration test, it is obviously extremely difficult, if not impossible, to perform the test under urban conditions. Furthermore, even where the acceleration test is conducted on the open highway, the results are often measured in terms of the driver's opinion of the test and not in terms of instrument readings. Therefore, in spite of the well-known and many advantages to be obtained by an acceleration test of the automobile, such testing is largely neglected.

Some attempts have in the past been made to provide acceleration testing devices for use in garages and service stations but these, insofar as I am aware, have been generally unsuccessful. In order to be accurate, a satisfactory device for testing acceleration must take into account the mass of the car resisting acceleration. Thus, in devices where the drive wheels of the car are supported on rollers or endless belts, it is necessary to provide some kind of load on such rollers or belts to simulate such mass. However, the load which must be so applied to simulate the force required to overcome the inertia of such mass is a function of both the rate of acceleration and the mass of the vehicle. Previous testing devices of this nature have either ignored these considerations or they have been too complicated for ordinary garage and service station use.

Accordingly, a principal object of the invention is to provide a vehicle testing apparatus adapted for garage and service station use which will accurately respond to the acceleration of an automotive vehicle and produce results which closely approximate the results obtained in an actual road test of the vehicle.

A further object of the invention is to provide an apparatus, as aforesaid, which is sufficiently simple in construction that it can be both manufactured and maintained in good operating condition with sufficient economy to be acceptable for ordinary garage and service station use.

A further object of the invention is to provide an apparatus, as aforesaid, which will be sufficiently simple in its operation to be adaptable to ordinary garage or service station use.

A further object of the invention is to provide an apparatus, as aforesaid, which will be sufficiently light in weight that it can be readily moved from place to place in a garage or service station, and which will occupy a minimum of floor space in any given installation, including the space required for an approach ramp of minimum length.

A further object of the invention is to provide an apparatus, as aforesaid, which can be sold as an effective and fully operative basic unit, to which additional indicating and recording devices may be easily attached, as desired, for improving the usefulness of the basic unit and for extending the operations which it is capable of performing.

A further object of the invention is to provide an apparatus, as aforesaid, which provides a resistive load to the drive wheels of the automotive vehicle in direct and accurate proportion to the power delivered to the drive wheels by the vehicle engine.

A further object of the invention is to provide an apparatus, as aforesaid, which is directly responsive to the acceleration developed by the wheels connected to the automotive engine and which can be readily adjusted to compensate for the weight of the automobile to be tested.

A further object of the invention is to provide an apparatus, as aforesaid, wherein the drive wheels of the automotive vehicle are supported upon a plurality of rollers in such a manner that the area of contact between the tires of the vehicle and the supporting rollers will closely approximate the normal area of contact between such tires and the road in a conventional road test.

A further object of the invention is to provide an apparatus, as aforesaid, which, if desired, can be mounted directly on the floor of a garage or service station rather than in a pit and which in use will operate satisfactorily if the rear wheels of the vehicle are elevated only a few inches above the floor and which thereby makes it unnecessary to elevate the front wheels of the vehicle during the test.

A further object of the invention is to provide an apparatus, as aforesaid, having a plurality of small rollers arranged to define an arc corresponding to the average diameter of a tire and arranged as close together as possible so that each roller supports a portion of the weight of the vehicle to thereby minimize distortion of the tire and thereby obtain more accurate readings, particularly for high speed operations.

A further object of the invention is to provide an apparatus, as aforesaid, in which the resistive load is applied to the drive wheels by a pair of units, each unit contacting one of the drive whels and having two sets of rollers with integral brake shoes and pressure applying devices, each of which units can be removed bodily from the main frame of the apparatus for servicing.

Other objects and purposes of the invention will be apparent to persons acquainted with devices of this general type upon reading the following specification and inspecting the accompanying drawings, in which.

Figure 1:
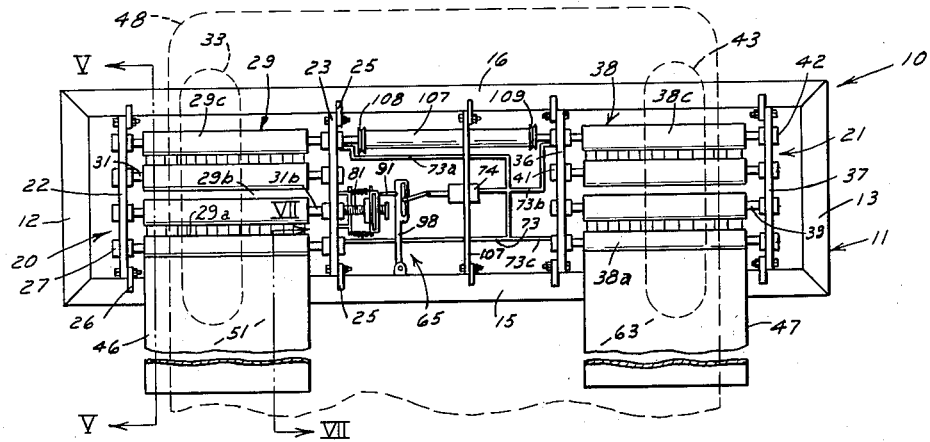
Figure 1 is a plan view of a structure embodying the invention and including a broken line, fragmentary disclosure of a vehicle operatively associated therewith.
Figure 5:
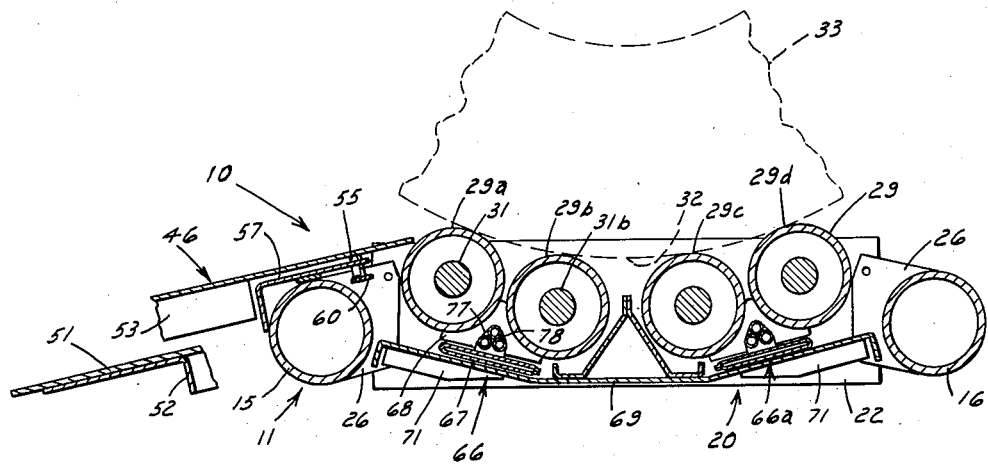
Figure 5 is a sectional view taken along the line V—V of Figure 1 and rotated 90 degrees clockwise.
Figure 6:
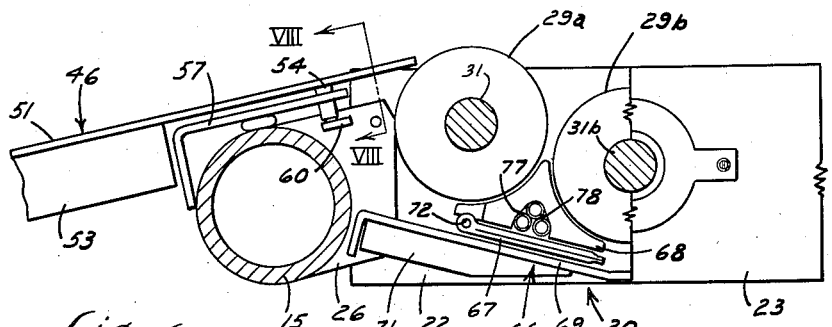
Figure 6 is a sectional view taken along the line VI—VI of Figure 2.
Figure 7:
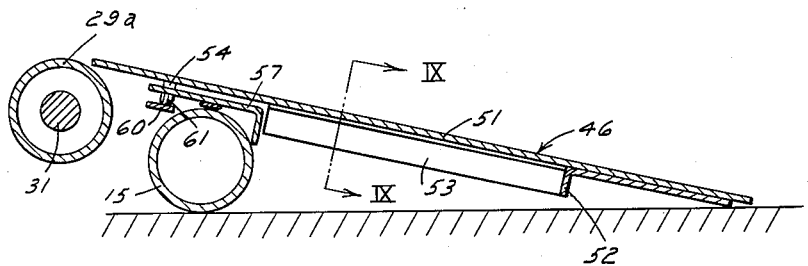
Figure 7 is a sectional view taken along the line VII—VII of Figure 1.

For the purpose of convenience in description, the terms "upper," "lower" and derivatives thereof will have reference to the structure of the invention and parts thereof in their normal position of use, as appearing in Figures 5, 6 and 7. The terms "left," "right" and derivatives thereof will have reference to the corresponding ends of the structure embodying the invention, as appearing in Figure 1. The terms "front," "rear" and derivatives thereof will have reference to the corresponding ends of the vehicle with which the structure of the invention is used and, more specifically, the "front" end of such structure will be the lower end as appearing in Figure 1. The terms "inner," "outer" and derivatives thereof will have reference to the geometric center of said structure and parts associated therewith.

General description

In order to meet the objects of this invention, there has been provided a base frame upon which a plurality of rollers are rotatably mounted for engaging and supporting the drive wheels of an automotive vehicle with respect to the ground or a floor. Power operated braking devices are effective for imposing a resistance to the rotation of said rollers corresponding to the inertia of the car on a road test. An acceleration sensitive device is connected, directly or indirectly, to at least one of the rollers. The acceleration sensitive device includes mechanism for converting an acceleration in the rotation speed of the rollers into an operation of said braking devices which is in a predeterminable proportion to the magnitude of acceleration experienced by the rollers. In this particular embodiment, the acceleration sensitive device operates independently of the rotational speed of the rollers. Thus, when the drive wheels are accelerated, a corresponding load is applied to said rollers by said braking devices and to the drive wheels of the automobile thereby resisting the acceleration of the engine in substantially the same manner as the mass of the automobile resists such acceleration during a conventional road test. Similarly, when the automobile engine is running at a constant speed, no resistive load is applied to the driving wheels, which likewise corresponds to the conditions in a road test when the automobile is operating at a constant speed. However, where it becomes desirable, the test apparatus can be arranged to compensate for the wind resistance and frictional losses which normally exist during an actual road test, whether the vehicle engine is operating at a constant velocity, or is being accelerated.

Detailed construction

One embodiment of the acceleration tester 10 (Figure 1), which is hereinafter disclosed in detail for illustrative purposes, includes a substantially rectangular frame structure 11 having two end elements 12 and 13, a front element 15 and a rear element 16. The said frame elements are preferably fabricated from iron or steel pipe and are connected together at their adjacent ends, as by welding.

The frame structure 11 (Figure 1) supports a pair of wheel engaging units 20 and 21 near the left and right ends thereof, respectively. The left wheel engaging unit 20 is supported upon a pair of spaced and parallel support bars 22 and 23 which extend between the frame elements 15 and 16 near their leftward ends. Said bars are removably secured, as by bolts, to the end brackets 25 and 26 which are secured, as by welding, to said frame elements 15 and 16. A pair of bearings 27 and 28 are mounted in the support bars 22 and 23, respectively, the bearings 27 being axially aligned with the bearings 28. A plurality, here four, of rollers 29, which are preferably equal on number to the pairs of aligned bearings 27 and 28, are mounted coaxially upon shafts 31, which are rotatably supported by the bearings 27 and 28. As shown in Figure 5, the rollers 29 are arranged so that the upper portions of their outer surfaces define an arc which is substantially identical with the periphery 32 of the wheel 33 with which the tester 10 is designed to be used. The arcuate arrangement of the rollers 29 will cause less distortion of the tire during operation than would occur if the tire were on a level surface. This significantly improves the accuracy of the tester, particularly for high speed acceleration testers.

The right wheel engaging unit 21 (Figure 1) may be, and preferably is, identical in structure to the left wheel engaging unit 20 to the extent that it has been described above. More specifically, the right wheel engaging unit 21 has a pair of support bars 36 and 37 which extend between, and are secured to, the front and rear frame elements 15 and 16, near the rightward ends thereof. A plurality, here four, of rollers 38 have shafts 39 which are rotatably supported by the bearings 41 and 42 mounted on the support bars 36 and 37, respectively. The rollers 38 are preferably arranged in a maner substantially similar to that shown in Figure 5 with respect to the rollers 29, so that they will engage the periphery of a wheel 43 (Figure 1) when the rollers 29 are engaging the wheel 33.

A pair of ramps 46 and 47 (Figure 1) are associated with the wheel engaging units 20 and 21 for the purpose of permitting the coaxial drive wheels 33 and 43 of a vehicle 48 to move over the front frame element 15 onto the wheel engaging units 20 and 21, respectively. In this particular embodiment, the wheels 33 and 43 are the right and left rear wheels, respectively, of an automobile which is backed up the ramps 46 and 47 into position upon the acceleration tester 10.

Figure 9:
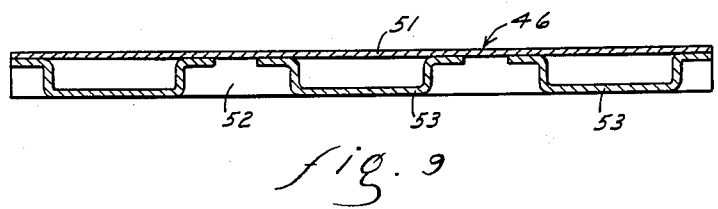
Figure 9 is a sectional view taken along the line IX—IX of Figure 7.

The ramp 46 (Figures 5 and 7) is comprised of a flat, rigid top plate 51, which is reinforced by a transverse angle member 52 (Figures 7 and 9) secured to its lower side near its lower edge, and three channel shaped members 53, which are also secured to the lower surface of said top plate 51 and extend from the angle member 52 toward, but not to, the upper edge of the plate. A pair of pressure posts 54 and 55 (Figures 5 and 7, respectively), are secured to, and extend downwardly from, said top plate 51 near the upper edge thereof.

Figure 8:
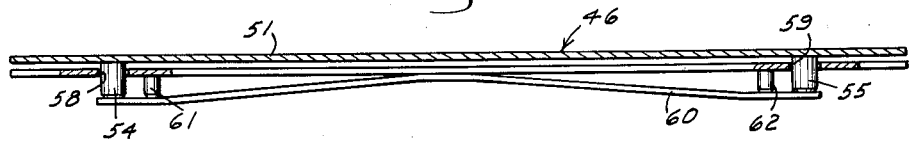
Figure 8 is a sectional view taken along the line VIII—VIII of Figure 6.

A platform 57 (Figures 6 and 7) is secured, as by welding, upon the front frame element 15 so that it is substantially parallel with the top plate 51 when said plate is resting upon the ground and the platform 57. The platform 57 extends inwardly of the front element 15 and has in its inner edge a pair of openings 58 and 59 (Figure 8) through which the pressure posts 54 and 55, respectively, are slidably received, thereby preventing movement of the top plate 51 in a direction transversely of the pressure posts 54 and 55. A leaf spring 60 is secured near its center point (Figure 8) to the lower side of the platform 57 so that its opposite end portions extend across the openings 58 and 59 for engagement by the pressure posts 54 and 55. The leaf spring 60 prevents engagement between the top plate 51 and the platform 57 when no downward force is being applied to the top plate 51. A pair of limit pins 61 and 62 are secured to the platform 57 and extend downwardly therefrom adjacent to the post openings 58 and 59 to engage the opposite ends of the leaf spring 60 and thereby limit the upward urging of the pressure posts 54 and 55 by the leaf spring 60.

As shown in Figures 6 and 7, the top plate 51 extends over the adjacent, front roller 29a and the spring 60 holds the upper edge of the top plate 51 spaced from said roller 29a unless a substantial downward force is applied to the top plate 51. Such a force is provided when the wheels of a vehicle roll up the ramp 46. The spacing between the upper edge of the top plate 51 and the front roller 29a is preferably less than the spacing between the top plate 51 and the platform 57, whereby the weight of the vehicle imposed upon the upper (leftward in Figure 7) end of the ramp 46 will force the edge of said ramp into contact with the roller 29a. Thus, the ramp 46 will be supported on the roller 29a in addition to the front frame element 15. This arrangement not only permits the use of a lighter frame structure, but also prevents the top plate 51 from teetering around a fulcrum provided by the front frame element 15, which could be extremely hazardous for obvious reasons. When the wheel passes beyond the edge of the ramp, spring 60 will lift the ramp upwardly out of contact with roller 29a.

The ramp 47 associated with the right wheel engaging unit 21 may be, and preferably is, substantially identical to the left ramp 46. More specifically, the ramp 47 has a top plate 63 which passes over the front frame element 15 and extends slightly above the front roller 38a (Figure 1) in the wheel engaging unit 21.

Figure 2:
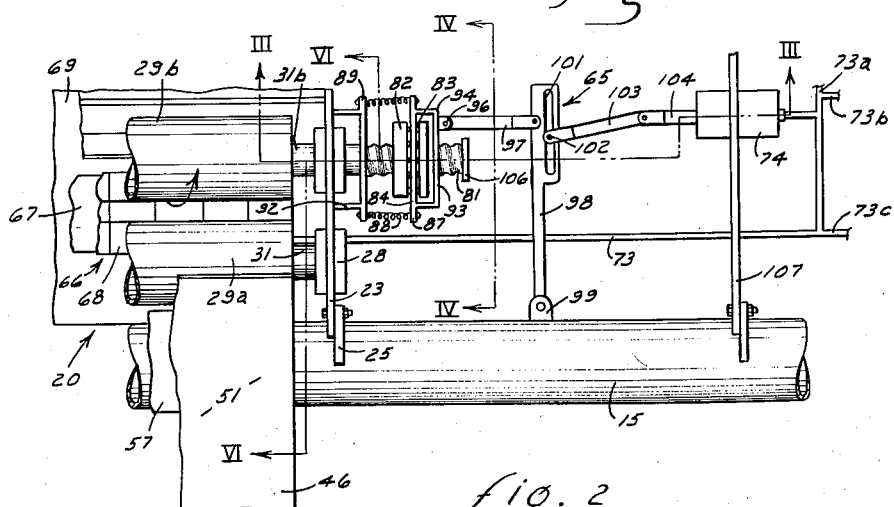
Figure 2 is an enlarged fragment of the structure disclosed in Figure 1.

The wheel engaging units 20 and 21 are provided with a compensating mechanism 65 (Figures 1 and 2) whereby resistance to the free rotation of the rollers 29 and the rollers 38 is supplied in proportion to the rate of acceleration of the rollers so resisted. That is, as the rate of acceleration of the rollers 29 and 38 is increased, the resistance to their rotation is also increased by the compensating mechanism 65.

The compensating mechanism 65 (Figure 2) includes a pair of identical brake devices 66 and 66a (Figure 5). The brake device 66 is positioned below rollers 29a and 29b while brake device 66a is positioned below rollers 29c and 29d. Since the brake devices 66 and 66a are identical, only the device 66 will be described in detail. The brake device 66 has an elongated hollow and inflatable member 67, which is disposed below, and near to, the rollers 29a and 29b. A plurality of brake shoes 68 are supported upon said inflatable member 67 and are engageable with the rollers 29a and 29b. The inflatable member 67 is in turn supported upon a base plate 69, which is secured, as by means of angle members 71, upon and between the support bars 22 and 23.

The inflatable member 67 has a fluid opening 72 (Figure 6) at the inner end thereof which is connected to one end of a pressure fluid conduit 73 (Figures 1 and 2), the other end of which is connected to one end of a pressure cylinder 74. Brake device 66a and the brake devices associated with the unit 21 are also connected to cylinder 74 by conduits 73a, 73b, and 73c. Accordingly, as the pressure in the pressure cylinder 74 is increased, as by means of the piston 76 within such cylinder 74, the inflatable members of the brake devices are expanded and thereby cause the brake shoes thereof to frictionally engage the rollers adjacent thereto. The brake shoes 68 are each provided with a recess 77 adjacent to the inflatable member 67 for reception of a plurality of coolant conducting pipes 78, which carry away the heat generated during the brake applying operation.

Figure 3:
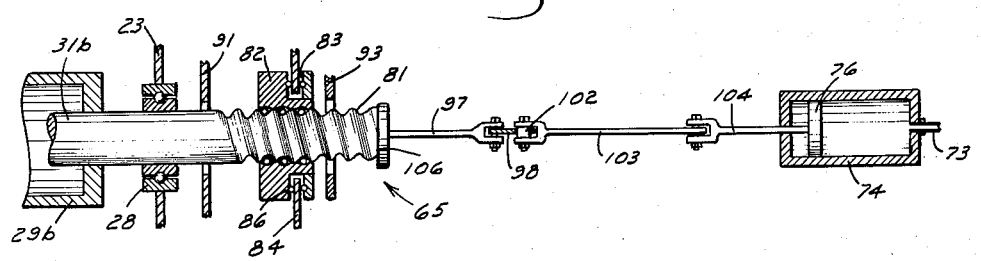
Figure 3 is a sectional view taken along the line III—III of Figure 2.
Figure 4:
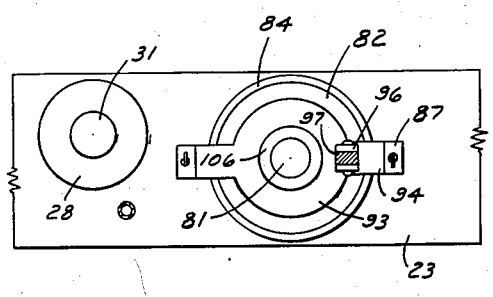
Figure 4 is a sectional view taken along the line IV—IV of Figure 2 and rotated 90 degrees clockwise.

One of the shafts 31 or 39 supporting one of the rollers 29 or 38 here the shaft 31b supporting the roller 29b, is connected, here directly, to a shaft 81 which extends through the bearing 28 and substantially beyond the support bar 23. Obviously the shaft 81 could be provided on any one of the rollers. Such shaft 81 is threaded for threaded engagement by, and support of, an inertia member 82. Said inertia member 82, which is preferably cylindrical, has in its periphery an annular groove 83 (Figure 3) in which a thrust ring 84 is rotatably held concentric with said shaft 81. Bearing means, such as the bearing balls 86, are disposed between the axial surfaces of the annular groove 83 and thrust ring 84. Said ring 84 has at least two radially extending and integral ears 87 (Figures 2 and 4) to which are secured, respectively, one end each of a pair of spiral springs 88. The other ends of said springs 88 are secured, respectively, to similarly disposed ears 89 on the mounting ring 91, which encircles the shaft extension 81 and is secured, as by means of the legs 92, upon the adjacent surface of the support bar 23. Accordingly, movement of the thrust ring 84 along the shaft 81 away from the support bar 23 is opposed by the spiral springs 88. The bearings 27 and 28 are secured to the shaft 31b so that said shaft will not move axially with respect to such bearings when the spiral springs 88 are placed under such tension. The shaft 81 is made sufficiently long that the inertia member 82 and the thrust ring 84 will move axially to the end of the shaft.

A support ring 93 is mounted, as by means of the legs 94 (Figures 2 and 4), upon the thrust ring 84 and provided with a bifurcated bracket 96 in which one end of the thrust arm 97 is pivotally supported. The other end of the thrust arm 97 is pivotally supported upon the adjustment lever 98 at a point spaced substantially from one end thereof, which end is pivotally supported upon the front element 15 by means of the bracket 99. Said adjustment lever 98 is disposed substantially perpendicular to the lengthwise extent of the front element 15 and has a lengthwise slot 101 the center of which is near the pivotal connection between the thrust arm 97 and the lever 98. An adjusting element 102, which is pivotally engaged by one end of the adjusting arm 103, extends through the slot 101, and is capable of adjustable positioning lengthwise of the slot 101.

The other end of the adjusting arm 103 (Figures 2 and 3) is pivotally mounted upon the outer end of the piston rod 104 which is secured to the piston 76 in the pressure cylinder 74. Said cylinder 74 is supported upon the plate 107, which extends between, and is secured to, the front and rear frame elements 15 and 16, respectively. The shaft 81 is provided with an end flange or collar 106 which blocks axial movement of the inertia member 82 off said shaft 81 as may conceivably occur under abnormal operating conditions. However, as pointed out above, the shaft 81 is of sufficient length that there will be no contact between collar 106 and inertia member 82 or the ring 93 during normal operation.

During a test operation of the mechanisms 65 and the compensating mechanism for the other wheel of the vehicle, the rollers 29 and 38, and particularly the roller 29b having the shaft 81, are rotated by the wheel 33 of the vehicle supported thereon. In this particular embodiment, the shaft 81 is provided with a righthand thread in order to effect movement of the inertia member 82 away from the roller 29b when the shaft 81 is rotated faster than the member 82. However, it will be recognized that this is a matter of choice in that a lefthand thread would be required to produce the same results, if the wheel was rotated in the opposite direction. Furthermore, it will also be recognized that, by the provision of suitable linkage between the support ring 93 and the lever 98, for example, the threads on the shaft 81 could be arranged so that a rotation of the shaft 81, faster than the inertia member 82, would effect an axial movement of the inertia member 82 toward the roller 29b. This would place the springs under compression with generally similar results to those obtained with the structure disclosed and described herein.

In order to reduce to a minimum the effects of friction between the inertia member 82 and the shaft 81, particularly when the spiral springs 88 are effecting a return movement of the inertia member 82 toward the roller 29b, ball-bearing type threads of a substantially conventional type may be provided.

A shaft 107 (Figure 1) is connected to and between a pair of rollers 29 and 38 of the units 20 and 21. The shaft 107 has pulleys 108 and 109 at either end thereof. The pulleys 108 and 109 may be connected, as by V-belts, to test equipment, such as a speed indicator or other test equipment which may be used for testing purposes.

The shaft 81 may alternatively be driven from shaft 107 rather than from shaft 31b, if desired.

Operation

The acceleration tester 10 (Figure 1) is placed upon the floor or other surface normally supporting the vehicle 48 (Figure 1) with which it is to be used.

The adjusting element 102 (Figures 2 and 3) on the adjusting arm 103 is now moved into its proper position along the slot 101 according to the weight of the vehicle 48 being supported upon the units 20 and 21. When the adjusting element 102 is located at the outer end of the slot 101 the mechanical advantage of the lever 98 is substantially less than when the adjusting element 102 is at the inner end of said slot. The precise location of the adjusting element, which can be accurately preselected, depends upon and varies with the weight of the vehicle tested. As the weight increases, the adjusting element 102 is moved toward the inner end of the slot 101.

The ramps 46 and 47 are mounted upon the front frame element 15 so that the pressure posts 54 and 55 (Figure 8) on the ramp 46, for example, engage the leaf spring 60 whereby the upper or inner edge of the ramp is held at a slight distance above the periphery of the front roller 29a. As the traction, or drive, wheels, here the wheels 33 and 43 of the vehicle 48, begin to move up the ramps 46 and 47, respectively, the weight of the vehicle causes the upper ends of the ramps 46 and 47 to bear against the front rollers 29a and 38a, respectively, against the contrary urging of the leaf spring 60. The wheels 33 and 43 then move across the upper ends of the ramps 46 and 47, respectively, onto the wheel engaging elements 20 and 21, where they are cradled within the rollers 29 and 38, respectively. The acceleration tester 10 is now ready to test the vehicle 48 supported thereon.

The wheels 33 and 43 are commenced rotating by the vehicle engine. As long as such rotation remains at a substantially constant velocity, the compensating mechanism 65 of the tester 10 is not materially affected and the inertia member 82 rotates with the shaft 81. However, when the rotation of the wheel 33 is accelerated, the roller 29b and the shaft 81 are also accelerated. Because of the inertia of the member 82, it will not accelerate simultaneously with the shaft 81. Thus, there will be between these two elements a relative rotation which, because of their threaded engagement, will cause the member 82 to move rightwardly, thereby overcoming the contrary urging of the springs 88 and forcing the thrust arm 97 rightwardly. Such rightward forcing of the thrust arm 97 will pivot the lever 98 and, acting through the adjusting arm 103, will cause the piston to increase the pressure of the pressure fluid within the pressure cylinder 74. This pressure increase is transmitted to the inflatable member 67 of each of the brake devices through the conduits 73, 73a, 73b and 73c thereby causing the brake shoes to engage the rollers 29 and 38 and resist the rotation in proportion to the rate of acceleration of said roller 29b. This engagement is maintained as long as such acceleration continues to exist. As soon as the roller 29b reaches a constant angular velocity, the spiral springs 88 move the inertia member 82 back along the shaft 81, thereby removing the pressure from within the pressure cylinder 74 and terminating the resistive engagement of the shoes 68 with the rollers.

The brake shoes of the respective brake devices impose upon the rollers 29 and 38 a frictional drag and load which is directly responsive and proportional to the pressure within the cylinder 74. Thus, in order to simulate actual road conditions, the element 102 must be located accurately with respect to the weight of the vehicle tested, such weight being proportional to the effects of inertia for which the compensation is made.

In this embodiment, the compensating mechanism 65 is responsive only to acceleration. Thus, the springs 88 are selected so that no material rightward force is applied to the arm 97, hence no material pressure develops in the cylinder 74, when the shaft 81 is rotating at a constant velocity.

Accordingly, the compensating mechanism 65 resists acceleration of the rotation of the wheels 33 and 43 on the vehicle 48 in the same manner that inertia resists acceleration of said vehicle during a road test. Such resistance is transmitted by said wheels to the engine of the said vehicle, thereby simulating the actual operation conditions of the engine normally encountered in a road test. However, the vehicle 48 will remain in a substantially constant position, thereby permitting the connection of the vehicle engine to permanently installed, highly accurate, testing equipment located near, or connected to, the acceleration tester.

If desired, independent braking means, not shown, may be provided for applying to the rotation of the rollers 29 and 38 an additional drag, which will be in constant amount, whether the speed of the vehicle is being accelerated or remaining constant, in order to simulate the effects of wind resistance and/or frictional losses encountered by the vehicle during a normal, actual road test. Furthermore, such separate braking means may also be utilized for the purpose of locking, or substantially opposing the rotation of, the rollers 29 and 38 when it becomes desirable to move the vehicle off of the acceleration tester 10. In such case, the wheels 33 and 43 will move up the rollers of the respective units 20 and 21 onto the ramps 46 and 47 and thence down said rams onto the floor supporting the tester.

Alternate construction

Figure 10:
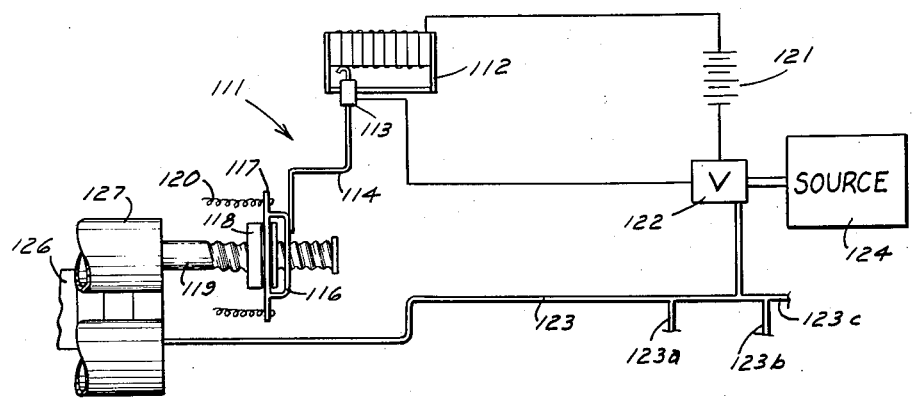
Figure 10 is a broken, fragmentary view of an alternate structure embodying the invention.

As shown in Figure 10, an alternate compensating mechanism 111 includes a rheostat 112 having a slider 113 which is secured to one end of an actuating member 114. The other end of the member 114 is positively secured to, and removable with, the support ring 116, which is mounted upon the thrust ring 117. The thrust ring 117 may be rotatably supported upon an inertia member 118 which threadedly engages a shaft extension 119 in substantially the same manner as the shaft 81 of Figure 2 supports the inertia member 82. Springs 120 resist rightward movement of the inertia member 118 along the shaft 119.

The rheostat 112 and slider 113 are in a series circuit with a source 121 of electrical energy and an electrically operated flow control valve 122. The inlet of the valve 122 is connected to a source 124 of substantially constant pressure. The outlet of the valve 122 is connected to four conduits 123, 123a, 123b and 123c which are, respectively, connected to the inflatable members, such as inflatable member 126, of the brake devices located beneath the wheel engaging rollers, such as rollers 127. Accordingly, in this alternate embodiment, an acceleration in the rotational speed of the shaft 119 effects a rightward movement of the inertia member 118, thereby producing a reduction in the resistance of the rheostat. Thus, an increased potential is impressed upon the valve 122 which permits an increase in the flow of pressure fluid from the source 124 to the inflatable members. This results in a coresponding increase in the load imposed by the compensating mechanism 111 upon the rollers in a manner substantially similar to that set forth above with respect to the compensating mechanism 65.

As soon as the rotation of the roller 127 and shaft 119 returns to a constant velocity, the springs 120 move the member 118 leftwardly until the rheostat 112 causes the valve 122 to disconnect the pressure source 124 from the conduit 123 and, at the same time, to bleed the pressure from said conduit 123 in any well-known manner.

It will be observed that the wheel engaging unit 20, including the support bars 23 and 22, rollers 29 and brake devices 66 and 66a, is removable from the apparatus as a single unit. Similarly, brake unit 21 is removable from the apparatus as a single unit. Thus, the brake units may be removed when servicing thereof is required and they may be replaced with similar units without requiring disassembly of the entire apparatus.

Although particular preferred embodiments of the invention have been disclosed in detail hereinabove for illustrative purposes, it will be understood that variations or modifications of such disclosure which lie within the scope of the appended claims, are fully contemplated.

I claim:

1. An automotive acceleration testing device adapted particularly for garage and service station use, comprising the combination: means including roller means for supporting the drive wheels of an automotive vehicle with respect to a floor, said roller means being rotatable with said wheels; rotation-resisting means operatively associated with said roller means, said rotation-resisting means comprising brake-shoe means movable toward and away from said roller means in response to a pressure imposed thereon for frictionally resisting rotation of said roller means with a force proportional to said pressure; control means controlling the pressure imposed on said brake-shoe means and thereby controlling the magnitude of resistance to rotation applied by said rotation-resisting means; an acceleration-responsive means operatively connected to said roller means so as to be driven at a speed proportional to the speed of said roller means, said acceleration-responsive means including means for operating said control means when said roller means are accelerating to modify said pressure in response to the magnitude of acceleration appearing in said roller means whereby rotation of the roller means is resisted in proportion to the acceleration appearing in said roller means, and the resistance so developed on said roller means is applied to said drive wheels and whereby acceleration of the engine of said automotive vehicle is resisted in a manner to simulate the resistance effected by the inertia of the vehicle developed in actual road acceleration of said vehicle.

2. The device defined in claim 1 wherein said brake-shoe means are movable toward and away from said roller means in response to fluid pressure and said acceleration responsive means acts to modify said fluid pressure in response to the magnitude of acceleration appearing in said roller means.

3. An automotive acceleration testing device adapted particularly for garage and service station use, comprising the combination: means including roller means for supporting the drive wheels of an automotive vehicle with respect to a floor, said roller means being rotatable with said wheels; rotation resisting means operatively associated with said roller means; control means controlling the magnitude of resistance to rotation applied by said rotation-resisting means; an acceleration-responsive means comprising a worm rotatable by said roller means at a speed proportional to the speed of said roller means, an inertia device threaded onto said worm and being movable axially therealong when said roller means are accelerating and means responsive to axial movement of said inertia device for operating said control means and thereby controlling the magnitude of resistive force applied to said roller means whereby rotation of the roller means is resisted in proportion to the acceleration appearing in said roller means, and the resistance so developed on said roller means is applied to said drive wheels and thereby acceleration of the engine of said automotive vehicle is resisted in a manner to simulate the resistance effected by the inertia of the vehicle provided in actual road acceleration of said vehicle.

4. The device defined in claim 3 wherein the means responsive to axial movement of said inertia device includes a fluid pressure cylinder having a plunger extending outwardly therefrom and a lever pivoted about a point fixed with respect to said cylinder and linkage connected to said inertia means through said lever to said plunger, said linkage being movable toward and away from said pivot point for adjusting the ratio of force developed by said inertia means with respect to the force applied by said plunger to compensate for the different weights of cars being tested.

5. An automotive acceleration testing device adapted particularly for garage and service station use, comprising the combination: a frame structure; a plurality of rollers rotatably supported upon said frame and adapted for supporting the drive wheels of an automotive vehicle with respect to a floor, said roller means being rotatable with said wheels; a ramp extending from the floor to a point above one of said rollers; resilient means urging said ramp away from said one roller, said urging being overcome as said vehicle moves up said ramp whereby said ramp is supported upon said one roller and the floor; rotation-resisting means operatively associated with said roller means; control means controlling the magnitude of resistance to rotation applied by said rotation-resisting means; an acceleration-responsive means operatively connected to said roller means so as to be driven at a speed proportional to the speed of said roller means, said acceleration-responsive means including means for operating said control means when said roller means are accelerating whereby rotation of the roller means is resisted in proportion to the acceleration appearing in said roller means, and the resistance so developed upon said roller means as applied to said drive wheels and thereby acceleration of the engine of said automotive vehicle is resisted in a manner to simulate the resistance effected by the inertia of the vehicle developed in actual road acceleration of said vehicle.

6. An automotive acceleration testing device adapted particularly for garage and service station use, comprising in combination: two sets of transversely spaced rollers for supporting the drive wheels of an automotive vehicle, each of said sets of rollers including a plurality of closely spaced rollers arranged to define an arc of substantially constant radius corresponding to the radius of a tire, each set of rollers being adapted to cradle a drive wheel; a braking device including brake-shoe means engageable with the rollers of each set for resisting rotation thereof; control means for moving said brake-shoe means into and out of frictional engagement with said rollers for controlling the magnitude of resistance to rotation of the rollers applied by said brake-shoe means; acceleration responsive means connected to rollers for actuation thereby so as to be driven at a speed proportional to the speed of the rollers, said acceleration-responsive means including an inertia element movable with respect to the remainder of said acceleration-responsive means when said rollers are accelerated; means connecting said inertia elements to said control means so that said control element is actuated by movement of said inertia element whereby rotation of said rollers is resisted by said rollers in proportion to the acceleration appearing in said rollers and the resistance so developed on said rollers is applied to said drive wheels and thereby acceleration of the engine of said automotive vehicle is resisted in a manner to simulate the resistance effected by the inertia of the vehicle developed in actual road acceleration of said vehicle.

7. An automotive acceleration testing device adapted particularly for garage and service station use, comprising: roller means for supporting the drive wheels of an automotive vehicle with respect to a floor, said roller means being rotatable with said wheels; fluid pressure operated brake means for resisting rotation of said roller means with a force variable in response to the value of fluid pressure applied thereto; control means for controlling the value of fluid pressure applied to said brake means; acceleration-responsive means including reference means connected to said roller means and rotatable at a speed proportional to the speed of rotation thereof and also including inertia means mounted on said reference means for movement therealong; spring means normally maintaining said inertia means in a predetermined position on said reference means when said drive wheels are not accelerating, said spring means being adapted to yield to permit relative movement between said inertia means and reference means when said drive wheels are accelerating; and connecting means connecting said inertia member to said control means so that said control means are actuated in response to movement of said inertia means with respect to said reference means to control the value of the fluid pressure applied to said brake means so that the resistance effected by the inertia of the vehicle in actual road acceleration thereof is simulated.

References Cited in the file of this patent

UNITED STATES PATENTS

| | | |
|---|---|---|
| 1,964,532 | Platzer | June 26, 1934 |
| 2,287,084 | Bennett | June 23, 1942 |
| 2,306,845 | Sherman et al. | Dec. 29, 1942 |
| 2,389,572 | Winther | Nov. 20, 1945 |
| 2,414,356 | Bogen et al. | Jan. 14, 1947 |
| 2,685,199 | Wilson et al. | Aug. 3, 1954 |
| 2,749,747 | Cline | June 12, 1956 |
| 2,803,132 | Clayton | Aug. 20, 1957 |